US011162042B2

(12) United States Patent
Swensen et al.

(10) Patent No.: US 11,162,042 B2
(45) Date of Patent: Nov. 2, 2021

(54) AGGLOMERATION OF ULTRA-FINE COAL PARTICLES

(71) Applicant: OMNIS MINERAL TECHNOLOGIES, LLC, Santa Barbara, CA (US)

(72) Inventors: James S. Swensen, Santa Barbara, CA (US); Jonathan K. Hodson, Santa Barbara, CA (US); John G. Gritt, Santa Barbara, CA (US); Nathan A. Chapman, Santa Barbara, CA (US); Paul R. Samario, Santa Barbara, CA (US); Michael R. Hodson, Santa Barbara, CA (US); Simon K. Hodson, Santa Barbara, CA (US)

(73) Assignee: OMNIS MINERAL TECHNOLOGIES, LLC, Santa Barbara, CA (US)

( * ) Notice: Subject to any disclaimer, the term of this patent is extended or adjusted under 35 U.S.C. 154(b) by 13 days.

(21) Appl. No.: 16/735,102

(22) Filed: Jan. 6, 2020

(65) Prior Publication Data
US 2020/0140773 A1    May 7, 2020

Related U.S. Application Data

(62) Division of application No. 15/596,953, filed on May 16, 2017, now Pat. No. 10,526,556.

(51) Int. Cl.
*C10L 5/14* (2006.01)
*C10L 5/24* (2006.01)
*C10L 5/36* (2006.01)

(52) U.S. Cl.
CPC ............... *C10L 5/14* (2013.01); *C10L 5/24* (2013.01); *C10L 5/361* (2013.01); *C10L 5/363* (2013.01);
(Continued)

(58) Field of Classification Search
CPC .. C10L 5/14; C10L 5/361; C10L 5/363; C10L 5/24; C10L 2290/30;
(Continued)

(56) References Cited

U.S. PATENT DOCUMENTS 4,025,596 A     5/1977 Parks et al.
4,113,817 A *   9/1978 Kroger .................... C08K 3/04
                                                           264/120
(Continued)

FOREIGN PATENT DOCUMENTS

CN          103212282 A      7/2013
WO            0114504 A1     3/2001

OTHER PUBLICATIONS

Kahl Flat Die Pelletin Presses (available online 2004).
James E. Mills, Binders for Coal Briquets, USGS, Bulletin 343, 1908.

*Primary Examiner* — Pamela H Weiss
(74) *Attorney, Agent, or Firm* — Kirton McConkie; Evan R. Witt

(57) ABSTRACT

A method of preparing agglomerates of ultra-fine coal particles includes mixing a film forming agglomeration aid (FFAA) with a quantity of ultra-fine coal particles to form ultra-fine coal particles coated with the FFAA. The FFAA has a lower surface energy relative to a surface of the ultra-fine coal particles. The FFAA is mixed with the ultra-fine coal particles in an amount less than 3% by weight of the ultra-fine coal particles on a dry basis. Agglomerates of the ultra-fine coal particles coated with the film forming agglomeration aid are formed using vibration, pelleting, and/or briquetting. The agglomerates have a size of at least 2 mm. The ultra-fine coal particles have a particle size less than 100 μm. The agglomerate has a tumbler test friability less than 3%. The drop shatter friability is also less than 3%.

19 Claims, 1 Drawing Sheet

(52) U.S. Cl.
CPC ....... *C10L 2250/04* (2013.01); *C10L 2250/06* (2013.01); *C10L 2290/24* (2013.01); *C10L 2290/30* (2013.01)

(58) Field of Classification Search
CPC ............. C10L 2250/04; C10L 2290/24; C10L 2250/06; Y02E 50/30
See application file for complete search history.

(56) References Cited

U.S. PATENT DOCUMENTS

| | | | |
|---|---|---|---|
| 4,153,419 A | 5/1979 | Clayfield et al. | |
| 4,294,584 A | 10/1981 | Verschuur | |
| 4,670,181 A | 6/1987 | Mollinger et al. | |
| 5,009,671 A | 4/1991 | Franke et al. | |
| 5,980,595 A | 11/1999 | Andrews | |
| 6,165,238 A | 12/2000 | Parkinson | |
| 2008/0022586 A1* | 1/2008 | Gilbert | C10L 5/34 44/490 |
| 2009/0272028 A1* | 11/2009 | Drozd | F23K 1/00 44/569 |
| 2009/0312448 A1* | 12/2009 | Symons | C04B 35/6316 521/141 |
| 2011/0252701 A1* | 10/2011 | Soane | C02F 1/56 44/621 |
| 2015/0184099 A1* | 7/2015 | Swensen | C10L 5/04 44/594 |
| 2016/0082446 A1* | 3/2016 | Swensen | C10L 1/326 44/280 |

* cited by examiner

AGGLOMERATION OF ULTRA-FINE COAL PARTICLES

CROSS-REFERENCE TO RELATED APPLICATION

This application is a divisional of application Ser. No. 15/596,953, filed May 16, 2017, which is incorporated herein by reference.

BACKGROUND OF THE INVENTION

This disclosure relates to agglomerates of ultra-fine coal particles and to methods of forming such agglomeration.

BACKGROUND

Traditionally mined coal is crushed to a size between 0.5 inches and 2 inches for transport. The coal is crushed to this size and washed to provide a product that is nominally free of dust for long distance transport. At each transfer point, a certain amount of breakage and detrition occur creating fine particles or dust. Standard tests such as the drop shatter test and the tumbler test have been developed to measure the attrition of coal during these tests, and these tests are considered a measure of the robustness of the coal for shipment and handling. The results for both of these tests are expressed as a percent (%) friability value, which is a measure of the amount of material that was considered too small after the handling test.

ASTM D440-07 is a standard test method of drop shatter test for coal. The drop shatter test is a means of indicating the ability of a coal to withstand breakage when subjected to handling at the mine and during transit to the customer. It is best suited for measuring the resistance to breakage when handled in layers such as from the loader to mine car, from loading boom to rail car, from shovel to chute, etc.

ASTM D441-07 is a standard test method of tumbler test for coal. The tumbler test for coal measures the liability of coal to break into smaller pieces when subjected to repeat handling at the mine or subsequently by the distributor or by the consumer.

The normal industrial sizing and crushing processes produce many fine coal particles (0.3 mm to 2 mm) and ultra-fine coal particles (<0.3 mm and especially less than 0.1 mm). The handling and shipping of fine and ultra-fine coal particles has proven difficult. If shipped in a powder form, too much dust is released during transport resulting in lost product and particulate matter pollution. Both are viewed negatively. If exposed to rain, these small particles adsorb a lot of water and turn into a mud which makes it difficult to discharge from rail cars or other transport vessels. As a result, fine and ultra-fine coal particles are generally impounded as waste near the coal mine.

Because this problem has been understood for many years, different techniques have demonstrated that agglomerates of the fine coal powder can be made, commonly as a coal briquette but also as a coal pellet. These agglomerates are made with binding materials such as starches, lignosulfonates, tars, pitches, asphalts, or other binders. An early summary of coal briquette work for a wide range of particle sizes titled "Binders for Coal Briquets" was published in 1908 by James E. Mills, et al. In that document, Mills, et al. stated that for many tars, pitches and asphalts, 3 to 5 wt. % could make a satisfactory coal briquette if the bulk of the particles are greater than about 1 mm and if there are also some finer particles to fill interstitial space between the larger particles. The amount of binder needed to make an agglomerate strong enough to not undergo too much attrition during transportation is often cited in excess of 5% and as much as 10% and 15% if the particle size is less than 0.1 mm. At such high loading levels, the cost of the binder used exceeds the market value.

Mills, et al., page 17, state: "The fact that the binder exists unchanged in the briquet, its office being solely to coat the grains, fill up void spaces between the grains, and by its adhesive and cohesive properties hold the briquet together, points to the following conclusions. The amount of binder required will depend on the amount of the surface to be coated, and the amount of surface will depend on the size of the grains, on their density (that is, the density of the dry coal), and on the capillary pores in the coal. The theoretical relation between the amount of surface to be coated, the size of the grains, and the density of the coal can be easily computed." The relationship was then shown that total surface to be coated is $$\frac{3w}{rd}$$

where w is weight, r is particle radius, and d is coal density. Table 1 below was given by Mills, et al. to demonstrate how particle size influences the relative surface area of the particles to be coated.

TABLE 1

Relative surface area for particles of different sizes (from Mills, et al., p. 17, 1908).

| Number of meshes per inch | Diameter (mm) | Diameter (micron) | Relative Amount of Surface Area |
|---|---|---|---|
| 1 | 25.40 | 25,400 | 1.00 |
| 2 | 12.70 | 12,700 | 2.00 |
| 4 | 5.35 | 5,350 | 4.00 |
| 10 | 2.00 | 2,000 | 12.70 |
| 20 | 1.00 | 1,000 | 25.40 |
| 30 | 0.67 | 670 | 37.90 |
| 40 | 0.50 | 500 | 50.80 |
| 50 | 0.31 | 310 | 81.90 |
| 80 | 0.23 | 230 | 110 |
| 100 | 0.17 | 170 | 150 |
| 200 | 0.085 | 85 | 300 |
| — | 0.005 | 5.00 | 5,080 |
| — | 0.0025 | 2.50 | 10,160 |
| — | 0.00075 | 0.75 | 33,900 |
| — | 0.00025 | 0.25 | 101,600 |

Mills, et al., pages 17-19, further discuss the influence of particles size on the amount of binder needed:

"The variation in the size of the grains of coal has an even greater influence on the amount of binder required. The table below shows the relative amount of surface to be coated in coal slack of varying degrees of fineness.

"It will thus be seen that coal slack which will just pass a 20-mesh sieve has 6.35 times as much surface to be coated as the same weight of slack crushed so as to pass a screen of ¼-inch mesh [4-mesh], and that coal passing a 200-mesh sieve has 75 times the surface of coal just passing the ¼-inch mesh [4-mesh]. The very finest dust, having a diameter of 0.00025 millimeter, has 25,400 times the surface of coal just passing the ¼-inch mesh [4-mesh].

"This consideration is not purely theoretical. The remark of Wagner [Eng. And Min. Jour., vol. 71, 1901, p. 329], that it took 20 percent of pitch to briquet certain fine coal dust, is illustrative of its practical bearing. The degree of fineness of the slack coal used is one of the main factors in determining the percentage of binder necessary to produce a satisfactory briquet.

"Fine crushing of the coal slack gives the briquet a smoother surface that is more resistant to the weather; but this increase in the quality of the briquet is usually obtained at too great a cost, owing to the additional binder required, as explained above.

"Capillary pores increase the amount of surface to be coated and the amount of void space to be filled . . . .

"It is interesting, in this connection, to note that with all binders the coherence in the briquets at first increases but slowly with increase in the proportion of binder. Then suddenly the coherence increases very rapidly and the briquets become strong. Then when an excess of binder is added the increase in strength is again slight . . . . The explanation, of course, lies in the fact that at first there is not enough binder to coat all the grains of coal and there can be little coherence. When sufficient binder has been added to coat the grains, the strength increases rapidly. After the grains have been well coated there is little further gain in the strength with the use of additional binder.

"The amount of binder will depend on the amount of void space to be filled. There should always be enough of the finer coal and coal dust present to fill the spaces between the larger grains, or binder will be required to fill these spaces. Thus Wagner also found that a very large amount of binder was required to bind coal slack of a uniform size . . . ."

Mills, et al. are quoted extensively above to show the studies and understanding from the early 1900's demonstrated that as particle size is reduced, the surface area of the particles increases exponentially. It was also understood that as particle size decreased, the amount of binder needed to form a strong and coherent briquette increased significantly. They understood that the surface of the particles needed to be coated with the binder and that the binder had to begin to fill the void space between particles to give a strong agglomerate. They concluded that binder amounts as high as 20% were needed to make coherent briquettes out of very fine coal powder. Additionally, they observed that for uniform particle sizes where there were not fine particles filling the voids between larger particles, more binder was needed.

Such was the state of the art use of binders to make coal briquettes in 1908. There has been little improvement in coal briquette and coal pellet technology since that time. Indeed, Mills, et al. argue the cost of binders and the large amount of binder needed to make a strong coal agglomerate could likely make coal agglomeration, especially from fine coal powders, not cost effective.

A mature example of product to compare to coal briquettes that is sold commonly in the marketplace is charcoal briquettes. Starch is often the binder of choice. 5% to 15% (by weight) starch is required as a binder. For a thermal coal product that retails between $40 to $100 per ton, a binder input cost of $25 to $75 per ton of coal product is prohibitively high. The result is that coal agglomerates (e.g. pellets or briquettes) with such a high binder input cost can only be sold into high priced niche markets such as home heating coal or other retail applications.

It would be an advancement in the art to provide agglomerates of ultra-fine coal particles and to methods of forming such agglomeration that are commercially practical and cost effective.

SUMMARY OF THE INVENTION

This disclosure relates to agglomerates of ultra-fine coal particles and to methods of forming such agglomeration. The disclosed methods provide strong and coherent agglomeration of ultra-fine coal particles into forms such as briquettes and pellets at low binder amounts. The agglomerates are sufficiently strong and durable to be transportable and saleable into all markets where coal is used. Thus, the disclosed agglomerates create new market opportunities for ultra-fine coal particles. Further, the disclosed agglomerates and agglomeration methods provide a way to eliminate a significant problem in coal production, that is, the impoundment of fine coal particles as refuse.

Agglomerates of ultra-fine coal may be prepared by mixing a film forming agglomeration aid (FFAA) with a quantity of ultra-fine coal particles to form ultra-fine coal particles coated with the film forming agglomeration aid. Agglomerates are then formed from the ultra-fine coal particles coated with the film forming agglomeration aid. The agglomerates have a size of at least 2 mm. Agglomerates may be formed by any known or novel fine particle agglomeration method, including pellet extrusion, briquetting, vibration, and combinations thereof.

The ultra-fine coal particles have a particle size less than 100 µm. In some embodiments, the ultra-fine coal particles have a particle size less than 50 µm. In other embodiments, the ultra-fine coal particles have a particle size less than 25 µm. In still other embodiments, the ultra-fine coal particles have a particle size less than 10 µm.

The film forming agglomeration aid is predominantly hydrophobic, having a lower surface energy relative to a surface of the ultra-fine coal particles which is coated by the FFAA. This enables the FFAA to efficiently coat the coal particles. The FFAA is a carbon-based polymer. The FFAA may be a natural or plant-based polymer. The FFAA may be a synthesized polymer. The FFAA may be selected from starches, cellulose, lignin and lignosulfonates, polyvinyl acetates, polyurethanes and polyureas and copolymers of polyurethane/polyureas, acrylic polymers, including but not limited by polymethacrylic acid, polyacrylamide, polyacrylic acid, and copolymers of acrylic acid and acetates, copolymers of acrylic acid and polyvinylacohols, ionomers such as ethylene-methacrylic acid (surlyn), sulfonated perfluorocarbon (Nafion) and polystyrene sulfonate, polyvinyl acetate with grafted natural and synthetic nanofibers. The FFAA may comprise hydrophilic functional groups to facilitate aqueous solubility.

In some embodiments, the film forming agglomeration aid comprises a blend of two or more different FFAAs and wherein the blend is mixed with the ultra-fine coal particles in an amount less than 3% by weight of the ultra-fine coal particles on a dry basis. The different FFAAs may be selected to balance different properties of the FFAAs, such as strength, rheology, water resistance, and cost.

The film forming agglomeration aid is mixed with the ultra-fine coal particles in an amount less than 3% by weight of the ultra-fine coal particles on a dry basis. In some embodiments, the FFAA is mixed with the ultra-fine coal particles in an amount less than 2% by weight of the ultra-fine coal particles on a dry basis. In other embodiments, the FFAA is mixed with the ultra-fine coal particles in an amount less than 1% by weight of the ultra-fine coal particles on a dry basis.

In one non-limiting embodiment, the film forming agglomeration aid is mixed with a moist ultra-fine coal particles, such as a filter cake, under high shear conditions to cause the FFAA to coat a surface of the ultra-fine coal particles. In another non-limiting embodiment the film forming agglomeration aid is mixed with an aqueous slurry of ultra-fine coal particles under high shear conditions to coat a surface of the ultra-fine coal particles. The aqueous slurry may contain from 15 wt. % to 50 wt. % solids. The slurry with FFAA-coated ultra-fine coal particles is then dewatered to produce FFAA-coated ultra-fine coal particles having a moisture content less than 35 wt. %.

A variety of different mechanical dewatering techniques may be used to remove excess surface water from the ultra-fine coal particles. Non-limiting examples of such dewatering techniques include coarse and fine coal centrifuges, vacuum filtration, and plate and frame press filters for fine and ultra-fine size fractions.

Centrifuges are essentially the industrial versions of the domestic spin drier. Coal is fed into a rotating conical basket that is constructed from wedge-wire having apertures in the range of 0.5-0.25 mm, depending on the application. The centrifugal force drives the water through the bed whilst axial vibration assisted by the slope of the basket moves the dewatered coal to the discharge. Centrifuges are effective at removing most of the water.

Untreated slurries and flotation concentrates are typically dewatered using vacuum filtration or plate and frame press filters. Vacuum filtration can be applied to horizontal belt filters and to rotary drum or disc filters. In both cases, a vacuum is applied to a filter cloth, holding the filter cake to the filter medium (filter cloth) and drawing the water through the filter cloth. In the case of rotary drum or disc filters, the bottom section of the drum sits in a tank which receives the slurry. As the drum rotates, the solids are drawn to the filter cloth by the vacuum and once out of the bath, dewatering occurs. A scrapper on the other side of the drum removes the cake from the drum. In the case of the horizontal belt filter, the slurry is loaded on a belt with the filter cake becoming increasingly dryer until the cake falls off the end of the belt. Plate and frame press filters can achieve work through pressure being applied to recessed plates that squeeze the water out of the cake.

The agglomerates may be formed by vibrating the moist ultra-fine coal particles coated with the FFAA to form agglomerates having a size of at least 2 mm. The agglomerates may be formed by extruding the moist ultra-fine coal particles coated with the FFAA to form pellet agglomerates. The agglomerates may be formed by briquetting the moist ultra-fine coal particles coated with the FFAA to form briquette agglomerates. Pellet and briquette agglomerates may be further processed by vibrating the agglomerates. It has been observed that vibration densifies the agglomerate and helps liberate interstitial water for subsequent drying.

The agglomerates of ultra-fine coal particles may comprise a blend of two or more sources of ultra-fine coal particles. This may enable the agglomerate to possess coal characteristics representing a blend of the coal characteristics of the different ultra-fine coal particles blended together. Thus, the agglomerate may possesses one or more coal properties equivalent to coal from which the ultra-fine coal particles originate, wherein the coal properties are selected from volatile matter, ash chemistry, and rank.

The ultra-fine coal particles may comprise less than 10 wt. % coal-derived mineral matter present in the form of inherent mineral matter and free coal-derived mineral matter particles. In other embodiments, the ultra-fine coal particles comprise less than 5 wt. % coal-derived mineral matter present in the form of inherent mineral matter and free coal-derived mineral matter particles. In yet other embodiments, the ultra-fine coal particles comprise less than 3 wt. % coal-derived mineral matter present in the form of inherent mineral matter and free coal-derived mineral matter particles. In still other embodiments, the ultra-fine coal particles comprise less than 1 wt. % coal-derived mineral matter present in the form of inherent mineral matter and free coal-derived mineral matter particles.

The ultra-fine coal particles may comprise less than 1 wt. % sulfur. In other embodiments, the ultra-fine coal particles comprise less than 0.5 wt. % sulfur.

Agglomerates of ultra-fine coal particles disclosed herein have a size dimensions greater than 2 mm, wherein a film forming agglomeration aid is present in an amount less than 3% by weight of the total dry mass of the agglomerate, wherein the ultra-fine coal particles have a particle size less than 100 μm.

Based upon observed tumbler and drop shatter friability tests, one can expect the agglomerates of ultra-fine coal particles to maintain form and structural integrity during transportation. Tumbler test friability is less than 3%. In other non-limiting embodiments, tumbler test friability is less than 2%. In still other non-limiting embodiments, tumbler test friability is less than 1%. Drop shatter friability is less than 3%. In other non-limiting embodiments, drop shatter friability is less than 2%. In still other non-limiting embodiments, drop shatter friability is less than 1%.

Agglomerates of ultra-fine coal particles disclosed herein preferably absorb less than 2% by weight water upon exposure to water for two weeks. In some non-limiting embodiments, the agglomerates absorb less than 1% by weight water upon exposure to water for two weeks.

To enhance water resistance, the agglomerate of ultra-fine coal particles may have a water repellant surface coating present in an amount less than 0.5% by weight of the agglomerate on a dry basis. The water repellant surface coating may be present in an amount less than 0.1% by weight of the agglomerate on a dry basis.

DESCRIPTION OF THE INVENTION

Figure 1:
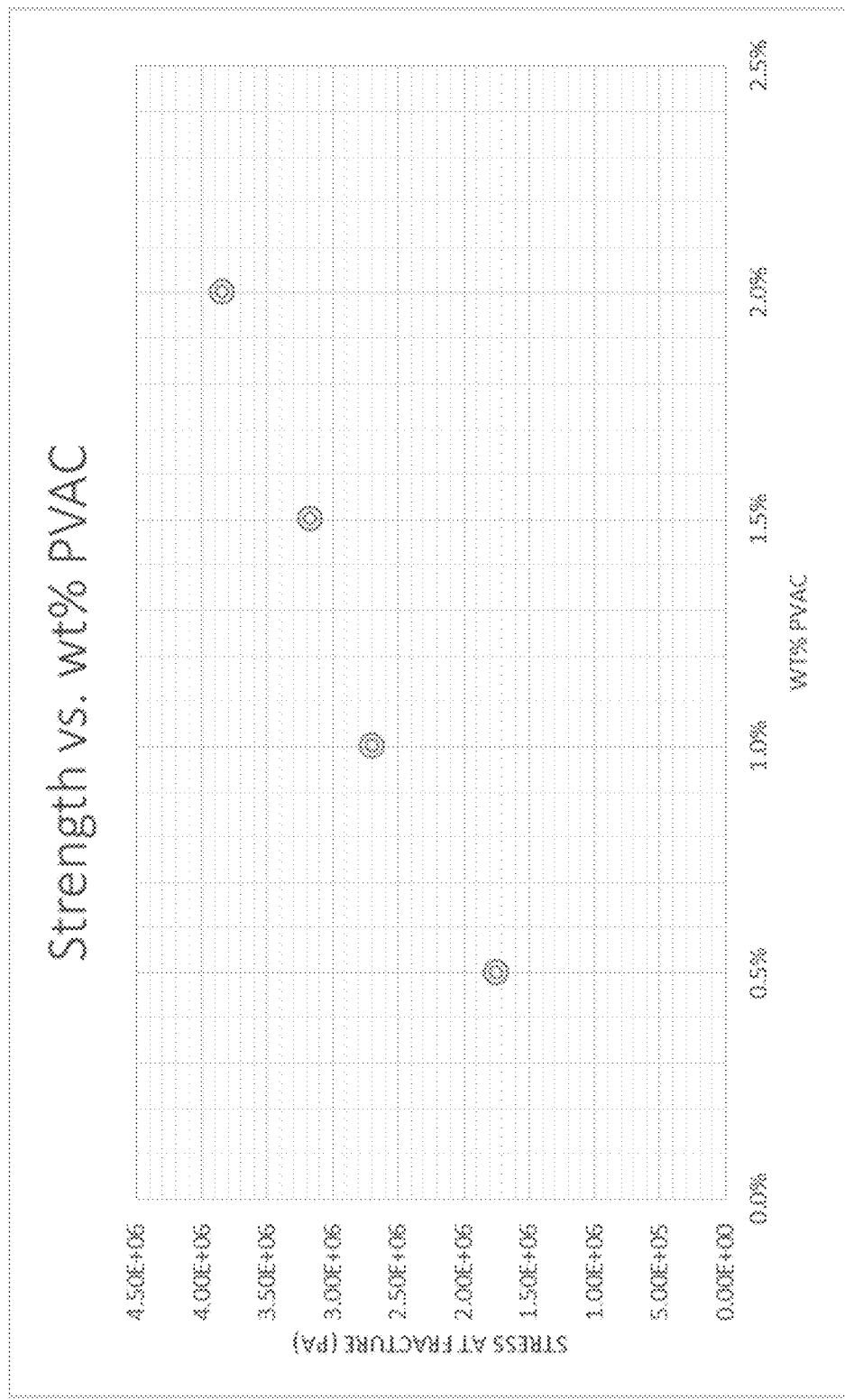
FIG. 1 shows is a graph of the average strength of briquettes made by varying the amount of a polyvinyl acetate (PVAC) FFAA in the agglomerate.

This disclosure relates to agglomerates of ultra-fine coal. A film-forming agglomeration aid (FFAA) is used to create coherent and strong agglomerates of ultra-fine coal particles while minimizing the amount used for this purpose. The film forming agglomeration aid is predominantly hydrophobic, having a lower surface energy relative to a surface of the ultra-fine coal particles which is coated by the FFAA.

For an adhesive to adhere to a surface, the adhesive needs to have a lower surface energy than the surface to which it is being adhered. A film or liquid with a lower surface energy relative to the surface to be covered can achieve full coverage of a surface with less material, e.g. a thinner film or thinner liquid layer. For example, one drop of water on a 10 mm×10 mm glass slide will cover the whole surface with a thin layer of water. The glass is higher surface energy than the water allowing the water to spread out on its surface with a low contact angle. A drop of water placed on the same sized polyethylene slide forms a droplet on the polyethylene surface with a high contact angle. The polyethylene has a lower surface energy than water causing water to form a droplet with high contact angle. It would require many drops of water to completely cover the 10 mm×10 mm polyethylene slide, and the water layer would be very thick.

When a FFAA having a lower surface energy relative to a surface of the ultra-fine coal particles is properly applied to coal particles at an appropriate amount, a very thin film covers or coats the surface the coal particles. This film then serves to help lubricate the particle system and act as a rheology modifying agent to enable flow when needed for agglomeration shaping. The film also enables the particles to adhere to each other to create a strong and cohesive agglomerate.

A method to form a strong and cohesive agglomerate composed of ultra-fine coal particles is to have a thin adhesive film coating the surface of the ultra-fine coal particles in such a way that there is an adhesive film at each point where the particles touch. The adhesive film coating the particles need not be thick, it only needs to be present at particle-particle contact points. The thinner this film is, the less film material is needed to produce strong and cohesive coal agglomerates from ultra-fine coal particles. Without being bound by theory, the lower the surface energy or the more hydrophobic the FFAA is, the thinner the film formed by the FFAA on the fine particles surfaces may be to achieve full or near-full coverage of the surface area of the particles.

Coal molecular structure is large and complex carbon based macromolecules consisting of linked polyaromatic hydrocarbons and polycyclic hydrocarbons. By nature, the polyaromatic hydrocarbons are alkenes, e.g. they contain double bonds. Although alkenes are non-polar in nature, they are more polar than alkanes. Functional groups containing other atoms (e.g. O, S, N, P, B, etc.) in the polyaromatic hydrocarbons, such as but not limited to, thiols, thiophenes, thiones, sulfonates, alcohols, esters, ethers, carboxylic acids, amines, amides, imines, pyrrolidones, phosphodiesters, phosphines, borate, boronic acid, etc. serve to add polarity to the coal molecular structure.

Choosing a film forming agglomeration aid that has lower surface energy than the coal particles to be agglomerated will minimize the amount of FFAA needed to coat the ultra-fine coal particles and subsequently agglomerate the ultra-fine coal particles.

Mills, et al., referenced above, state that the briquettes and agglomerates of other shapes with high binder loading levels (e.g. 5% to 20% by weight or higher) begin to take on the properties of the binder that is used. For example a pellet made with 10 wt. % coal tar would be brittle in nature and shatter similar to the solid coal tar. When the binder starts to significantly fill the void spaces between particles, the agglomerate begins to take on the properties of the binder. However, the agglomerates disclosed herein do not fill the void spaces between particles with FFAA. Indeed, it is an object of the disclosed invention to avoid filling the voice spaces between particles with FFAA. In this manner, the agglomerates maintain the properties of the coal particles that make up the agglomerates and not properties of the FFAA. This is an important feature because the market does not want coal agglomerates that do not have the properties of coal.

Examples of FFAAs and How to Blend Them with Ultra-Fine Coal

In general, FFAAs are carbon based polymers, either from plants (e.g. starches, cellulose, lignin and lignosulfonates) or synthetic (e.g. polyvinyl acetates, polyurethanes and polyureas and copolymers of polyurethane/polyureas, acrylic polymers, including but not limited by polymethacrylic acid, polyacrylamide, polyacrylic acid, and copolymers of acrylic acid and acetates, copolymers of acrylic acid and polyvinylacohols, ionomers such as ethylene-methacrylic acid (surlyn), sulfonated perfluorocarbon (Nafion) and polystyrene sulfonate, polyvinyl acetate with grafted natural and synthetic nanofibers).

Preferably, the FFAA is applied to moist particles in a water based process so that drying the particles to completely remove water before application of the FFAA is not necessary. The moist particles are typically either in the form of an aqueous slurry or a filter cake, depending upon the moisture content. Although the bulk of the FFAA may have low surface energy qualities (e.g. aliphatic and/or aromatic), the molecular structure may also contain some higher surface energy or hydrophilic functionality (e.g. alcohols, ketones, ethers, esters, etc.) to allow the FFAA to go into aqueous solution. If the FFAA does not go into aqueous solution easily because it has too low of surface energy or is too hydrophobic, it may be delivered as an aqueous colloidal suspension of FFAA stabilized with surfactants.

The FFAA may be added to either a filter cake or a slurry of ultra-fine coal particles regardless of moisture content. Without being bound by theory, when the FFAA is mixed with the ultra-fine coal particles under high shear conditions for either a filter cake or a slurry, the FFAA has a higher affinity for the solid surfaces of the particles than it does for the water. The results is that more than 95% and usually more than 98% of the FFAA has been observed to attach itself to the hydrophobic coal particles rather than stay in the water when exposed to intensive mixing or agitation.

In one non-limiting embodiment, the film forming agglomeration aid is mixed with an aqueous slurry of ultra-fine coal particles under high shear conditions, wherein the aqueous slurry contains from 15 wt. % to 50 wt. % solids, and wherein the slurry with the agglomeration aid is dewatered to a moisture content less than 35 wt. %.

Ultra-Fine Coal Particle Sources and Ash (Mineral Matter) Content Levels

The ultra-fine coal particles used for agglomeration as discussed herein can come from a variety of sources: seam coal, run of mine coal, coal product from coal preparation facilities, ultra-fine coal refuse, etc. If the ash-forming or mineral matter content (hereinafter referred to as ash or mineral matter) is not as low as desired, an upgrading step such as milling and froth flotation separation may be employed to reduce the ash content to the desired level. Ash content as low as 0.1% by weight can be achieved for many coals through milling followed by froth flotation of ultra-fine coal particles. One non-limiting example of froth flotation is disclosed in Applicant's U.S. Patent Application Publication No. 2016/0082446, entitled "Flotation Separation of Fine Coal Particles from Ash-Forming Particles," which is incorporated by reference.

Blended FFAA

Two or more FFAAs can be blended to produce an agglomerate with desired properties. One possible property may be maximum strength. Another property may be minimum cost. The property may be an optimized balance of strength and cost. Other properties that may be controlled, modified, or balanced include, but are not limited to, rheology and water resistance.

Vibration Agglomeration

Vibration was used as an agglomeration technique. FFAA was mixed with an aqueous slurry of ultra-fine coal particles prior to dewatering in a filter press to 30 wt. % moisture content. The resulting filter cake was crumbled directly on to a vibratory table operating at 30 Hz. The crumbles agglomerated together in ball-shaped agglomerates. These ball-shaped agglomerates were discharged from the vibratory table on a continuous basis. They were thermally dewatered at 110° C. for 90 minutes. The frequency of the vibration induced agglomeration was shown to work in the range from a few hertz into the ultrasonic range.

The density of dry filter cake was lower than dried agglomerates formed from the filter cake exposed to vibration. This same increase in density after exposure to vibration was observed with extruded pellets that were dried compared to extruded pellets that were subsequently exposed to vibration agglomeration and then dried. Without being bound by theory, the reason for the increase in density when exposing filter cake, filter cake crumbs, or preformed agglomerates, such as briquettes or extruded pellets, to vibratory agglomeration is related to the thixotropic or shear thinning properties of the material. The presence of the FFAA serves to enhance the thixotropic behavior, e.g. thixotropic behavior occurs at lower moisture content than can be observed without the FFAA.

Thixotropic properties of filter cakes of fine and ultra-fine coal particles were observed in Applicant's U.S. Pat. No. 9,587,192, entitled "Vibration Assisted Vacuum Dewatering of Fine Coal Particles." That patent discloses the observed thixotropic behavior of the material under vibration and the theory that "When shear force or vibration is applied to the cake, some water bound to the surface of the particles is released from the surface of the particles and fills void spaces between particles. This water acts as a flow aid and allows the particles to move with respect to one another, resulting in the observed shear thinning and flow under vibration. When vibration is applied, some of the water is released from the surface of the particles and migrates to the cake surfaces." Col. 8, lines 33-41.

It is believed a similar phenomenon occurs in the disclosed agglomerate vibration such that when vibration is added to crumbles of filter cake, the filter cake crumbles show thixotropic or shear thinning characteristics. The individual crumbles form a cohesive agglomerate that shows evidence of flow or particle movement within the agglomerate while exposed to vibration. A film of water can be seen on the surface of the agglomerate and the agglomerate is wet to the touch, similar to the water observed on the filter cake surface exposed to vibration in the aforementioned patent. When the ball-shaped agglomerates made from filter cake crumbles come in contact with each other, they can interact to form larger agglomerates.

As previously stated, pre-agglomerated shapes (e.g. pellets, briquettes, etc.) can also be exposed to vibration. This exposure can cause little to no change in shape in the pre-agglomerated shapes if the exposure to the vibration is short. Still, even with exposure of a few seconds, observation of particle movement or flow within the agglomerate is observed similar to the above explained ball-shaped agglomerate formation from filter cake crumbles. A film of water can be seen on the surface of the agglomerate and the agglomerate is wet to the touch.

If either pre-formed agglomerates or the ball-shaped agglomerates formed by vibration exposure are exposed to vibration for a longer vibration residence time, then it has been observed that the smaller agglomerates flow together and form larger agglomerates. The shapes may be larger balls, larger flat discs, elongated shapes, etc.

Without being bound by theory, when the agglomerates are exposed to vibration, water bound to the surface of the particles comes off the surface and enters the interstitial space. The extra interstitial water helps facilitate vibration induced flow of particles with respect to one another within the agglomerate. Further, the addition of vibrational energy causes the particles to move with respect to one another and form a more tightly packed particle system. This is similar to shaking a bucket of rocks and pebbles and watching the volume decrease as the rocks and pebbles slide with respect to one another to form denser packing within the bucket. The densification of the agglomerates caused by addition of vibrational energy results in water being pushed from the bulk of the agglomerate to the surface of the agglomerate where it is observed as a thin film on the surface of the agglomerate.

Blended Agglomerates

Agglomerates possess the general properties of the ultra-fine coal particles used to prepare the agglomerates. Agglomerates of ultra-fine coal particles may be prepared with unique and predetermined properties or characteristics by blending two or more different sources of ultra-fine coal particles having different coal properties or characteristics. Non-limiting examples of coal properties or characteristics that can be controlled and predetermined include ash (mineral matter) content, volatile matter content, fluidity, coke reactivity index, coke strength after reaction, macerals, base to acid ratio, sulfur content, etc. Agglomerates of ultra-fine coal particles formed in this manner are a significant improvement in the art, and they may have increased market value.

The following non-limiting examples are given to illustrate several embodiments relating to the disclosed agglomerates of ultra-fine coal particles and methods of their preparation. It is to be understood that these examples are neither comprehensive nor exhaustive of the many types of embodiments which can be practiced in accordance with the presently disclosed invention.

EXAMPLE 1

Ultra-fine particles of coal with less than 5 wt. % ash-forming mineral matter content were produced through a froth flotation process using ultra-fine coal refuse as a feedstock. The coal-froth was then dewatered in a filter press to have about 30% moisture by weight (wt. %). The filter cake was placed in a mixer that provides high shear to the material being mixed. Non-limiting examples of how to create high shear mixing of the filter cake include scraping against the sidewall of the mixer with a paddle, forcing the material through stators with the paddles, and forcing the cake by high speed choppers. Different film forming agglomeration agents were tested at a control loading level of 2% by weight. Each of these FFAAs is compatible with water and either goes into solution in water or forms emulsions in water. The table below shows tumbler test % friability and drop shatter test % friability for pellets 9 mm diameter by 9 mm to 18 mm long for Coal 1 and Coal 2. The pellets were made via extrusion from filter cake material that had been mixed in a Hobart style high shear mixer, having about 30% by weight moisture and 2% by weight FFAA. The pellets had an equilibrium moisture of below 5% by weight before testing.

TABLE 2

| Film Forming Agglomeration Agent | Tumbler Test % Friability at 2 wt. % of FFAA | |
| --- | --- | --- |
| | Coal 1 | Coal 2 |
| gelled corn flour | 0.95% | 0.87% |
| gelled wheat starch | 0.92% | 0.83% |
| polyvinyl acetate | 0.81% | 0.72% |
| polyethylene oxide | 0.88% | 0.79% |
| acrylic based emulsion | 0.79% | 0.71% |
| methylhydroxy cellulose | 0.80% | 0.72% |
| carboxymethyl cellulose | 0.81% | 0.70% |
| Tumble Test % Friability of Parent Coal | 12.4% | 15.8% |
| HGI of Parent Coal | 63 | 84 |
| Volatile Matter of Parent Coal (wt. %) | 34% | 23% |
| Free Swelling Index of Parent Coal | 4 | 8 |
| Ash content of coal particles (wt. %) | 5% | 5% |
| Relative Oxidation (ASTM D5263) | 91 | 95 |
| d99 Particle Size (microns) | 47 | 39 |
| Average Particle Size (microns) | 12.1 | 9.8 |

TABLE 3

| Film Forming Agglomeration Agent | Drop Shatter Test % Friability at 2 wt.% of FFAA | |
| --- | --- | --- |
| | Coal 1 | Coal 2 |
| gelled corn flour | 0.86% | 0.75% |
| gelled wheat starch | 0.83% | 0.73% |
| polyvinyl acetate | 0.74% | 0.62% |
| polyethylene oxide | 0.81% | 0.69% |
| acrylic based emulsion | 0.71% | 0.62% |
| methylhydroxy cellulose | 0.73% | 0.61% |
| carboxymethyl cellulose | 0.72% | 0.60% |
| Drop Shatter Test % Friability of Parent Coal | 4.4% | 5.5% |
| HGI of Parent Coal | 63 | 84 |
| Volatile Matter of Parent Coal (wt. %) | 34% | 23% |
| Free Swelling Index of Parent Coal | 4 | 8 |
| Ash content of coal particles (wt. %) | 5% | 5% |
| Relative Oxidation (ASTM D5263) | 91 | 95 |
| d99 Particle Size (microns) | 47 | 39 |
| Average Particle Size (microns) | 12.1 | 9.8 |

EXAMPLE 2

Ultra-fine particles of coal with less than 5 wt. % ash-forming mineral matter content were produced through a froth flotation process using ultra-fine coal refuse as a feedstock. The coal-froth was then dewatered in a filter press to have about 30% moisture by weight (wt. %). The filter cake was dried in such a way as to produce a powder. Low Density Polyethylene was dissolved in an appropriate organic solvent. The polyethylene solution was mixed with dry powder of Coal 1 or Coal 2 at different loading levels such that 2%, 1% and 0.5% and 0.25% by weight were blended with the fine coal particles under high shear conditions. The mixed cake was pressed into briquettes. The briquettes were dried at 110° C. for 90 minutes. The tumbler test % friability and drop shatter test % friability results for those briquettes are shown below.

TABLE 4

| wt. % Film Forming Agglomeration Agent | Tumbler Test % Friability with polyethylene FFAA | |
| --- | --- | --- |
| | Coal 1 | Coal 2 |
| 0.25% | 2.81% | 2.70% |
| 0.50% | 0.94% | 0.82% |
| 1.00% | 0.85% | 0.75% |
| 2.00% | 0.79% | 0.68% |
| Tumble Test % Friability of Parent Coal | 12.4% | 15.8% |
| HGI of Parent Coal | 63 | 84 |
| Volatile Matter of Parent Coal (wt. %) | 34% | 23% |
| Free Swelling Index of Parent Coal | 4 | 8 |
| Ash content of coal particles (wt. %) | 5% | 5% |
| Relative Oxidation (ASTM D5263) | 91 | 95 |
| d99 Particle Size (microns) | 47 | 39 |
| Average Particle Size (microns) | 12.1 | 9.8 |

TABLE 5

| wt. % Film Forming Agglomeration Agent | Drop Shatter % Friability with polyethylene FFAA | |
| --- | --- | --- |
| | Coal 1 | Coal 2 |
| 0.25% | 2.49% | 2.46% |
| 0.50% | 0.83% | 0.74% |
| 1.00% | 0.74% | 0.69% |
| 2.00% | 0.69% | 0.60% |
| Drop Shatter % Friability of Parent Coal | 4.4% | 5.5% |
| HGI of Parent Coal | 63 | 84 |
| Volatile Matter of Parent Coal (wt. %) | 34% | 23% |
| Free Swelling Index of Parent Coal | 4 | 8 |
| Ash content of coal particles (wt. %) | 5% | 5% |
| Relative Oxidation (ASTM D5263) | 91 | 95 |
| d99 Particle Size (microns) | 47 | 39 |
| Average Particle Size (microns) | 12.1 | 9.8 |

EXAMPLE 3

Ultra-fine particles of coal with less than 5 wt. % ash-forming mineral matter content were produced through a froth flotation process using ultra-fine coal refuse as a feedstock. The fine coal particles were kept in the coal-froth state at 25 wt. % solids. FFAAs were blended in with the fine coal particles in the liquid suspension state (coal-froth or slurry) using agitation that provides quick and efficient mixing. One such method is a high shear mixer with a chopper blade. Another method uses a dispersion mixer such as a Silverson style mixer. Another is a batch or in-line high shear emulsifying mixer. This process keeps the coal particles individual and discrete so as to apply a surface coating to all the films with the chosen FFAA(s) in an efficient manner. Each of these FFAAs is compatible with water and either goes into solution in water or forms emulsions in water.

The coal-froth with the blended in FFAA was then dewatered. One dewatering method is vibration assisted vacuum dewatering of fine coal particles to reach the target moisture content for the agglomeration step that follows. Another method is filter press. In the filter press method, cake squeeze, core blow, and cake blow can be applied as needed to reach the target moisture content for the subsequent agglomeration step. The dewatered filter cake was a feedstock for an agglomeration step. Since the FFAA was already applied to the surface of the coal particles, further mechanical mixing was unnecessary. Optional cake homogenization may be beneficial in the subsequent agglomeration step. Filter cake from Coal 1 at 28% by weight moisture was extruded to create 9 mm diameter pellets with an aspect ratio of 1 to 2, e.g. 9 mm to 18 mm long.) The pellets were then thermally dewatered at 110° C. for 90 minutes. Moisture content was below 5 wt. %. The tumbler test % friability and drop shatter % friability results for those pellets are shown below. Alternatively, briquette agglomerates could also be formed with the cake containing the FFAA.

TABLE 6

Tumbler Test % Friability for Coal 1

| wt. % Film Forming Agglomeration Agent | gelled wheat starch | polyvinyl acetate | acrylic based emulsion | methylhydroxy cellulose |
|---|---|---|---|---|
| 0.25% | 2.83% | 2.71% | 2.73% | 2.70% |
| 0.50% | 0.95% | 0.83% | 0.82% | 0.82% |
| 1.00% | 0.87% | 0.77% | 0.76% | 0.75% |
| 2.00% | 0.83% | 0.72% | 0.71% | 0.72% |
| Tumbler Test % Friability of Parent Coal | | | 12.4% | |
| HGI of Parent Coal | | | 63 | |
| Volatile Matter of Parent Coal (wt. %) | | | 34% | |
| Free Swelling Index of Parent Coal | | | 4 | |
| Ash content of coal particles (wt. %) | | | 5% | |
| Relative Oxidation (ASTM D5263) | | | 91 | |
| d99 Particle Size (microns) | | | 47 | |
| Average Particle Size (microns) | | | 12.1 | |

TABLE 7

Drop Shatter Test % Friability for Coal 1

| wt. % Film Forming Agglomeration Agent | gelled wheat starch | polyvinyl acetate | acrylic based emulsion | methylhydroxy cellulose |
|---|---|---|---|---|
| 0.25% | 2.59% | 2.41% | 2.47% | 2.44% |
| 0.50% | 0.87% | 0.73% | 0.74% | 0.73% |
| 1.00% | 0.78% | 0.68% | 0.70% | 0.68% |
| 2.00% | 0.73% | 0.62% | 0.62% | 0.61% |
| Drop Shatter % Friability of Parent Coal | | | 4.4% | |
| HGI of Parent Coal | | | 63 | |
| Volatile Matter of Parent Coal (wt. %) | | | 34% | |
| Free Swelling Index of Parent Coal | | | 4 | |
| Ash content of coal particles (wt. %) | | | 5% | |
| Relative Oxidation (ASTM D5263) | | | 91 | |
| d99 Particle Size (microns) | | | 47 | |
| Average Particle Size (microns) | | | 12.1 | |

EXAMPLE 4

Coal-froth from a froth flotation process at 20% solids by weight without an FFAA mixed in was vacuum filtered. Coal-froth at 20% solids by weight with 2.0% by weight polyvinyl acetate (PVAC) FFAA mixed in was vacuum filtered. Coal-froth at 20% solids with 2.0 wt. % Acrylic emulsion FFAA mixed in was vacuum filtered. Clarified water (or filtrate) was collected from each run and analyzed for dissolved material. The results are shown below in Table 8. 95% of the PVAC blended into the froth slurry remained in the filter cake. 98% of the Acrylic emulsion remained in the filter cake.

TABLE 8

| | FFAA | |
|---|---|---|
| | PVAC | Acrylic |
| Description | Mass (kg) | Mass (kg) |
| Coal Particles | 0.800 | 0.800 |
| Water | 0.200 | 0.200 |
| Total FFAA | 0.012 | 0.012 |
| Actual Mass FFAA on coal particles | 0.01139 | 0.01178 |
| | % by weight | % by weight |
| FFAA loading (FFAA/Coal Particles) | 1.5% | 1.5% |
| True FFAA loading (Mass FFAA on Coal/Coal) | 1.424% | 1.473% |
| | Mass (g) | Mass (g) |
| Dissolved solids before FFAA | 0.20 | 0.20 |
| Dissolved solids after FFAA | 0.81 | 0.42 |
| Dissolved FFAA | 0.61 | 0.22 |
| Total FFAA used | 12.00 | 12.00 |
| | % by weight | % by weight |
| % FFAA that remained dissolved in water | 5.1% | 1.8% |
| % FFAA that coated the coal particles | 94.9% | 98.2% |

EXAMPLE 5

Coal-froth from a froth flotation process at 35% solids by weight without an FFAA mixed in was vacuum filtered. Coal-froth from a froth flotation process at 35% solids by weight with 2.0% by weight PVAC FFAA mixed in was vacuum filtered. Coal-froth from a froth flotation process at 35% solids with 2.0 wt. % Acrylic emulsion FFAA mixed in was vacuum filtered. Clarified water (or filtrate) was collected from each run and analyzed for dissolved material. The results are shown below in Table 9. 98% of the PVAC blended into the coal-froth slurry remained in the filter cake. 99% of the Acrylic emulsion remained in the filter cake.

TABLE 9

| | FFAA | |
|---|---|---|
| | PVAC | Acrylic |
| Description | Mass (kg) | Mass (kg) |
| Coal Particles | 0.650 | 0.650 |
| Water | 0.350 | 0.350 |
| Total FFAA | 0.00975 | 0.00975 |
| Actual Mass FFAA on coal particles | 0.00956 | 0.00965 |
| | % by weight | % by weight |
| FFAA loading (FFAA/Coal Particles) | 1.5% | 1.5% |
| True FFAA loading (Mass FFAA on Coal/Coal) | 1.472% | 1.485% |
| | Mass (g) | Mass (g) |
| Dissolved solids before FFAA | 0.35 | 0.35 |
| Dissolved solids after FFAA | 0.54 | 0.45 |
| Dissolved FFAA | 0.19 | 0.10 |
| Total FFAA used | 9.75 | 9.75 |
| | % by weight | % by weight |
| % FFAA that remained dissolved in water | 1.9% | 1.0% |
| % FFAA that coated the coal particles | 98.1% | 99.0% |

EXAMPLE 6

Vibration was used as an agglomeration technique. 1.0% by weight PVAC FFAA was blended with a 20 wt. % solids coal-froth slurry of Coal 2. The coal-froth slurry was then dewatered with a filter press to 30 wt. % moisture filter cake.

The filter cake was crumbled directly on to a vibratory table operating at 30 Hz. The crumbles agglomerated together in ball-shaped agglomerates. These ball-shaped agglomerates were discharged from the vibratory table on a continuous basis. They were thermally dewatered at 110° C. for 90 minutes. The frequency of the vibration induced agglomeration can range from a few hertz into the ultrasonic range.

The density of dry filter cake without vibration was 0.8 g/cc. The density of filter cake crumbs after vibration, agglomeration, and drying was 0.95 g/cc. The addition of vibration to the agglomerates resulted in an 18.8% increase in density.

EXAMPLE 7

Vibration was used as an agglomeration technique. A coal-froth slurry of Coal 2 was dewatered with a filter press to 30 wt. % moisture filter cake. 1.0% by weight PVAC FFAA was mixed with the 30 wt. % moisture filter cake of Coal 2 under high shear conditions in a Hobbart style mixer. The filter cake was extruded to make pellet shaped preformed agglomerates. The pellets were transferred to a vibratory table operating at 30 Hz. The pellets agglomerated together in ball-shaped agglomerates. These ball-shaped agglomerates were discharged from the vibratory table on a continuous basis. They were thermally dewatered at 110° C. for 90 minutes.

The density of dry extruded pellet agglomerates without added vibration was 0.85 g/cc. The density of the pellet agglomerates after vibration and drying was 0.95 g/cc. The addition of vibration to the agglomerates resulted in an 11.8% increase in density.

EXAMPLE 8

Air dried agglomerates with PVAC or an acrylic emulsion as the FFAA were tested for water reabsorption by soaking in water for 24 hours. Different amounts of FFAA were tested to show how FFAA amount influences water reabsorption. It was observed that the agglomerates generally absorbed less than 8 wt. % water after 24 hour immersion in water. In other embodiments, the agglomerates absorbed less than 5 wt. % water after 24 hour immersion in water. The agglomerates made with the acrylic FFAA were found to be more resistant to reabsorption of water than the agglomerates made with polyvinyl acetate FFAA.

TABLE 10

| wt. % Film Forming Agglomeration Agent | Water absorbed % by weight after 24 hours immersed in water | |
|---|---|---|
| | polyvinyl acetate | acrylic based emulsion |
| 0.25% | 8.09% | 4.36% |
| 0.50% | 7.80% | 4.28% |
| 1.00% | 7.26% | 4.15% |
| 2.00% | 6.21% | 3.87% |

EXAMPLE 9

After the agglomerates exit a thermal dewatering step (110° C. for 90 minutes), they can be coated with a thin moisture repellant film by passing the warm agglomerates through a bath coater or spray coater to form a thin moisture repellant film on the surface of the agglomerates. One preferred carrier fluid for formation of the thin water repellant film is water, but it could be an organic solvent.

In this example, an acrylic emulsion in water or PVAC in water were used to coat the surface of the pellets with a thin water repellant film. The film was dried by the heat released by the pellets as they cooled down. The pellets could also be passed through a heated trammel with flowing hot air, heated conveyor belt with flowing hot air, etc. to quickly dry and set the water repellant film after the bath or spray process. This process could be done any number of times to apply multiple coats to the agglomerate surface as desired and/or need. In a presently preferred embodiment, the pellets pass through spray, curtain coating, or bath coating steps from 1 to 4 times. Each coating step was found to add about 0.02% to 0.03% by weight to the total dry mass of the pellets.

Water absorption tests with agglomerates having 0.5 wt. % polyvinyl acetate or 0.5 wt. % acrylic based emulsion as the FFAA were used in the agglomeration step. The agglomerates were coated up to four times with thin water resistant or water repellant films deposited on the surface of the agglomerates with each coating step. Agglomerates with PVAC as the FFAA were coated with a thin film of PVAC. Agglomerates with acrylic emulsion as the FFAA were coated with a thin film of acrylic emulsion. Agglomerates with PVAC as the FFAA were coated with a thin film of acrylic emulsion. Agglomerates with acrylic emulsion as the FFAA were coated with a thin film of PVAC.

The agglomerates were allowed to reach an equilibrium moisture content for 85% relative humidity, which was 1.8 wt. % moisture. The agglomerates were allowed to soak in water for two weeks. The moisture content was then measured again. The agglomerates with water repellant absorbed less than 4% by weight water upon exposure to water for two weeks. In another embodiment, the agglomerates with water repellant absorbed less than 3% by weight water upon exposure to water for two weeks. In a further embodiment, the agglomerates with water repellant absorbed less than 2% by weight water upon exposure to water for two weeks. In yet another embodiment, the agglomerates with water repellant absorbed less than 1% by weight water upon exposure to water for two weeks. In order for the agglomerates with PVAC FFAA to have less than 1 wt. % increase in moisture content over the two week period, the PVAC films were about 0.06% to 0.08% by weight (wt. %) of the total dry agglomerate. In order for the agglomerates with the acrylic emulsion FFAA to have less than 1 wt. % increase in moisture content over the two week period, the acrylic emulsion films were about 0.03% to 0.05% by weight of the total dry agglomerate.

EXAMPLE 10

Coal briquetting is the process of compressing coal particles into a molded shape such as blocks, briquettes, pellets, etc. The briquetting process creates strong, dense agglomerates from the coal particles, allowing the agglomerates to be shipped and handled with little dusting or breakage. In general, agglomerates made through a conventional briquetting process are formed by mixing the coal particles with a binding agent at various moisture content levels and then forming the binding agent-particle mixture into an agglomerate via compression in a form or mold. For normal or general briquetting of coal particles, the amount of binding agent is usually between 5% and 15% by weight on a dry basis of the final agglomerate mass.

Ultra-fine particles of coal with less than 5 wt. % ash-forming mineral matter content on a dry basis and at about 80 wt. % moisture was produced via froth flotation. An aqueous FFAA, PVAC or Acrylic emulsion, was blended into the coal-forth with a high shear emulsifying mixer at different loading levels. The emulsifying mixer caused the coal particles and FFAA to interact such that the FFAA quickly and efficiently coated the coal particles.

The emulsifying mixer included a rotating blade that spins at very high speeds within a circular stator with gaps in the blade and the stator. The coal-froth slurry is drawn into the opening at the bottom of the ring shaped stator and forced out the small gaps between the rotor and stator at high speeds and shear. This action forced the FFAA and coal particles to intimately interact resulting in a thin film of FFAA deposited on the surface of the ultra-fine coal particles.

The coal-froth slurry with the thin FFAA coating on the ultra-fine coal particles was then dewatered by mechanical means to the lowest level possible, which was usually between 20% and 30% moisture by weight depending on particle size and coal rank. Dewatering was usually done either by filter press or by vibration assisted vacuum dewatering In this example the coal-froth mixed with FFAA was dewatered using a lab-scale vibration assisted vacuum dewatering apparatus. The coal-froth slurry blended with FFAA was poured on the vacuum dewatering apparatus. Coal-froth was poured onto the dewatering apparatus until a half inch thick filter cake was formed. When cracks formed in the filter cake, vibration was applied to the cake surface. The cracks in the cake are healed because of vibration induced flow. The vibration induced flow brought water to the surface of the cake which was removed from the cake via the vacuum dewatering process. A filter cake was produced at about 30 wt. % moisture where the coal particles are coated with FFAA prior to dewatering.

The filter cake was placed directly into the briquette forming mold. The mold consisted of a cylinder that was open on both ends and a metal plate that bolted to the cylinder. Filter paper was placed over the plate covering the opening of the cylinder prior to bolting the plate and cylinder together to form the mold. Two thirds of the volume of the cylindrical mold was filled with filter cake. A piston with tight tolerances to the cylindrical mold was forced down into the mold with a hydraulic press. As the pressure built, the filter cake inside was compressed into an agglomerate that was cylindrical in shape. 12 tons of pressure were applied. Taking into account the 2 inch diameter of the cylindrical mold, a pressure of about 8,400 psi was used to compress the coal filter cake into a cylindrical briquette agglomerate. The high pressure densified the coal particles in the filter cake into an agglomerate by reducing the interstitial space between particles. O-rings on the end of the piston sealed the piston to the inner walls of the cylindrical mold. At the pressure experienced during briquetting, some water was also forced out between the bottom of the mold and the bottom plate. The filter paper ensured that only water was forced out, keeping the coal particles inside the mold. The final moisture content was usually around 17% to 20% by weight of the agglomerates. The briquette was then dried to less than 5% moisture by weight in a drying oven at 100° C. for about an hour.

The bending strength of the coal agglomerates was measured. The agglomerates were cut and sanded into rectangular rods. The rods were then placed on a bending strength fixture and broken with a compressive strength analyzer (Stable Microsystems TA-XT2i) to measure the maximum force at breakage. The maximum stress at breakage was calculated using the raw data obtained with the texture analyzer and the bending stress equation. The equation normalizes for shape. The higher the stress at fracture, the greater the strength of the agglomerate.

FIG. 1 shows the average strength of briquettes made by varying the amount of a PVAC FFAA in the agglomerate. The stress at fracture increased in a linear fashion as more FFAA was added. The percent FFAA was measured on a dry FFAA to dry coal powder basis.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A method of preparing agglomerates of ultra-fine coal particles comprising:
    mixing a film forming agglomeration aid with a quantity of ultra-fine coal particles to form ultra-fine coal particles coated with the film forming agglomeration aid, wherein the ultra-fine coal particles have a particle size less than 100 µm, wherein the film forming agglomeration aid has a lower surface energy relative to a surface of the ultra-fine coal particles, wherein the film forming agglomeration aid is mixed with the ultra-fine coal particles in an amount less than 3% by weight of the ultra-fine coal particles on a dry basis; and
    forming agglomerates of the ultra-fine coal particles coated with the film forming agglomeration aid, wherein the agglomerates have a size of at least 2 mm, wherein the agglomerates do not contain coal particles greater than 100 µm.

2. The method of preparing agglomerates of ultra-fine coal particles according to claim 1, wherein the ultra-fine coal particles have a particle size less than 50 µm.

3. The method of preparing agglomerates of ultra-fine coal particles according to claim 1, wherein the ultra-fine coal particles have a particle size less than 25 µm.

4. The method of preparing agglomerates of ultra-fine coal particles according to claim 1, wherein the film forming agglomeration aid is mixed with the ultra-fine coal particles in an amount less than 2% by weight of the ultra-fine coal particles on a dry basis.

5. The method of preparing agglomerates of ultra-fine coal particles according to claim 1, wherein the film forming agglomeration aid is mixed with the ultra-fine coal particles in an amount less than 1% by weight of the ultra-fine coal particles on a dry basis.

6. The method of preparing agglomerates of ultra-fine coal particles according to claim 1, wherein the film forming agglomeration aid is a carbon-based polymer.

7. The method of preparing agglomerates of ultra-fine coal particles according to claim 1, wherein the film forming agglomeration aid comprises hydrophilic functional groups to facilitate aqueous solubility.

8. The method of preparing agglomerates of ultra-fine coal particles according to claim 1, wherein the film forming agglomeration aid comprises a blend of two or more different film forming agglomeration aids and wherein the blend is mixed with the ultra-fine coal particles in an amount less than 3% by weight of the ultra-fine coal particles on a dry basis.

9. The method of preparing agglomerates of ultra-fine coal particles according to claim 1, wherein the film forming agglomeration aid is mixed with a moist filter cake of ultra-fine coal particles under high shear conditions.

10. The method of preparing agglomerates of ultra-fine coal particles according to claim 1, wherein the film forming agglomeration aid is mixed with an aqueous slurry of ultra-fine coal particles under high shear conditions, wherein the aqueous slurry contains from 15 wt. % to 50 wt. % solids, and wherein the slurry with the agglomeration aid is dewatered to a moisture content less than 35 wt. %.

11. The method of preparing agglomerates of ultra-fine coal particles according to claim 10, wherein the slurry with the agglomeration aid is dewatered by vacuum filtration.

12. The method of preparing agglomerates of ultra-fine coal particles according to claim 10, wherein the slurry with the agglomeration aid is dewatered by filter press.

13. The method of preparing agglomerates of ultra-fine coal particles according to claim 1, wherein the agglomerates are formed by vibrating the ultra-fine coal particles coated with the film forming agglomeration aid to form agglomerates having a size of at least 2 mm.

14. The method of preparing agglomerates of ultra-fine coal particles according to claim 1, wherein the agglomerates are formed by extruding the ultra-fine coal particles coated with the film forming agglomeration aid to form pellet agglomerates.

15. The method of preparing agglomerates of ultra-fine coal particles according to claim 1, wherein the agglomerates are formed by briquetting the ultra-fine coal particles coated with the film forming agglomeration aid to form briquette agglomerates.

16. The method of preparing agglomerates of ultra-fine coal particles according to claim 1, further comprising the step of vibrating the agglomerates.

17. The method of preparing agglomerates of ultra-fine coal particles according to claim 1, wherein the ultra-fine coal particles comprise a blend of two or more sources of ultra-fine coal particles.

18. The method of preparing agglomerates of ultra-fine coal particles according to claim 1, further comprising the step of drying the agglomerates to a moisture content less than 5% moisture by weight.

19. The method of preparing agglomerates of ultra-fine coal particles according to claim 18, wherein the step of drying the agglomerates comprises thermal dewatering.

* * * * *